(12) United States Patent
Zhu et al.

(10) Patent No.: US 11,378,432 B2
(45) Date of Patent: Jul. 5, 2022

(54) MEASURING DEVICE HAVING AT LEAST ONE BENT MEASURING TUBE FOR DETERMINING A MASS FLOW MEASURED VALUE OF A MEDIUM ACCORDING TO THE CORIOLIS PRINCIPLE

(71) Applicant: Endress+Hauser Flowtec AG, Reinach (CH)

(72) Inventors: Hao Zhu, Freising (DE); Alfred Rieder, Landshut (DE)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 47 days.

(21) Appl. No.: 16/764,105

(22) PCT Filed: Oct. 30, 2018

(86) PCT No.: PCT/EP2018/079632
§ 371 (c)(1),
(2) Date: May 14, 2020

(87) PCT Pub. No.: WO2019/096575
PCT Pub. Date: May 23, 2019

(65) Prior Publication Data
US 2020/0278230 A1    Sep. 3, 2020

(30) Foreign Application Priority Data
Nov. 14, 2017   (DE) ..................... 10 2017 126 733.6

(51) Int. Cl.
*G01F 1/84* (2006.01)
(52) U.S. Cl.
CPC .......... *G01F 1/8427* (2013.01); *G01F 1/8422* (2013.01); *G01F 1/8431* (2013.01); *G01F 1/8477* (2013.01)

(58) Field of Classification Search
CPC ...... G01F 1/8422; G01F 1/8427; G01F 1/845; G01F 1/8468; G01F 1/8472; G01F 1/8477
See application file for complete search history.

(56) References Cited

U.S. PATENT DOCUMENTS 5,594,180 A * 1/1997 Carpenter ................ G01F 1/74
                                                        303/15
6,233,526 B1 * 5/2001 Cunningham ........ G01F 1/8436
                                                        702/45
(Continued)

FOREIGN PATENT DOCUMENTS

CN    1340694 A    3/2002
CN    1934425 A    3/2007
(Continued)

*Primary Examiner* — Erika J. Villaluna
(74) *Attorney, Agent, or Firm* — Christopher R. Powers; Endress+Hauser (USA) Holding Inc.

(57) ABSTRACT

The Coriolis flowmeter according to the present disclosure includes: a measuring sensor including a bent measuring tube mirror-symmetrical with respect to a transverse plane, wherein a measuring tube center line runs in a longitudinal plane oriented perpendicular to the transverse plane, wherein an equatorial surface runs perpendicular to the longitudinal plane along the measuring tube center line; an exciter for exciting measuring tube bending vibrations; a first pair of vibration sensors for capturing the bending vibrations of the measuring tube; and an operating and evaluation circuit for driving the exciter, for capturing signals from the vibration sensors, and for determining a mass flow measured value, wherein the measuring sensor has a second pair of vibration sensors, which are arranged in a mirror-symmetrical manner with respect to the transverse plane, wherein the first pair of vibration sensors is separated from the second pair of vibration sensors by the equatorial surface.

11 Claims, 2 Drawing Sheets

(56) References Cited

U.S. PATENT DOCUMENTS

| | | | |
|---|---|---|---|
| 8,695,439 B2* | 4/2014 | LeWinter | G01F 1/8422 73/861.357 |
| 2006/0169058 A1 | 8/2006 | Gysling | |
| 2010/0170322 A1 | 7/2010 | Van Cleve et al. | |
| 2010/0198531 A1 | 8/2010 | Bell et al. | |
| 2011/0167907 A1 | 7/2011 | Bitto et al. | |
| 2013/0133436 A1 | 5/2013 | Anklin-Imhof et al. | |
| 2016/0252380 A1 | 9/2016 | Henry et al. | |

FOREIGN PATENT DOCUMENTS

| | | |
|---|---|---|
| CN | 101076710 A | 11/2007 |
| CN | 101706299 A | 5/2010 |
| CN | 104378096 A | 2/2015 |
| CN | 105928578 A | 9/2016 |
| DE | 102008023056 A1 | 11/2009 |
| DE | 102009046839 A1 | 5/2011 |
| DE | 102011119980 A1 | 6/2013 |
| DE | 102012018988 A1 | 4/2014 |
| DE | 102015104931 A1 | 6/2016 |
| DE | 102015109790 A1 | 12/2016 |
| JP | 2016090516 A * | 5/2016 |

* cited by examiner

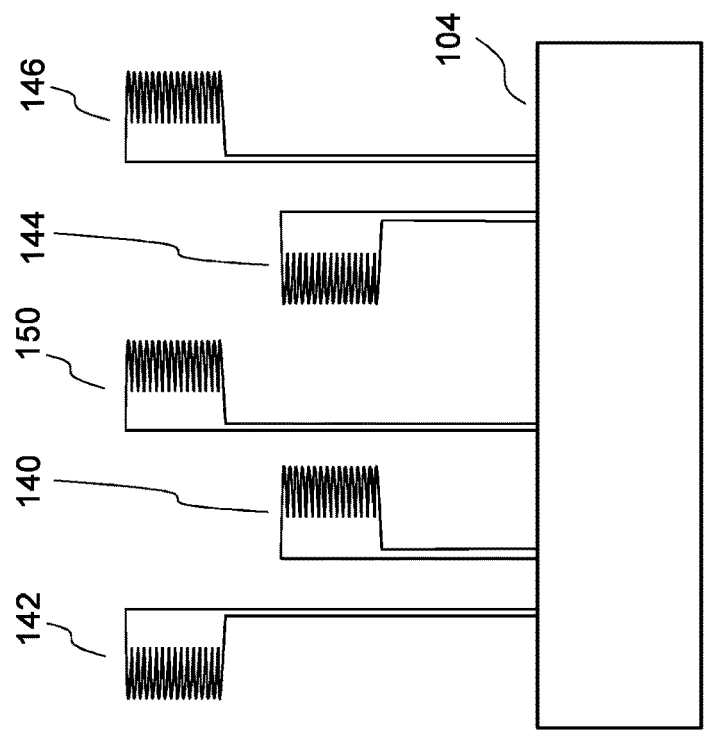
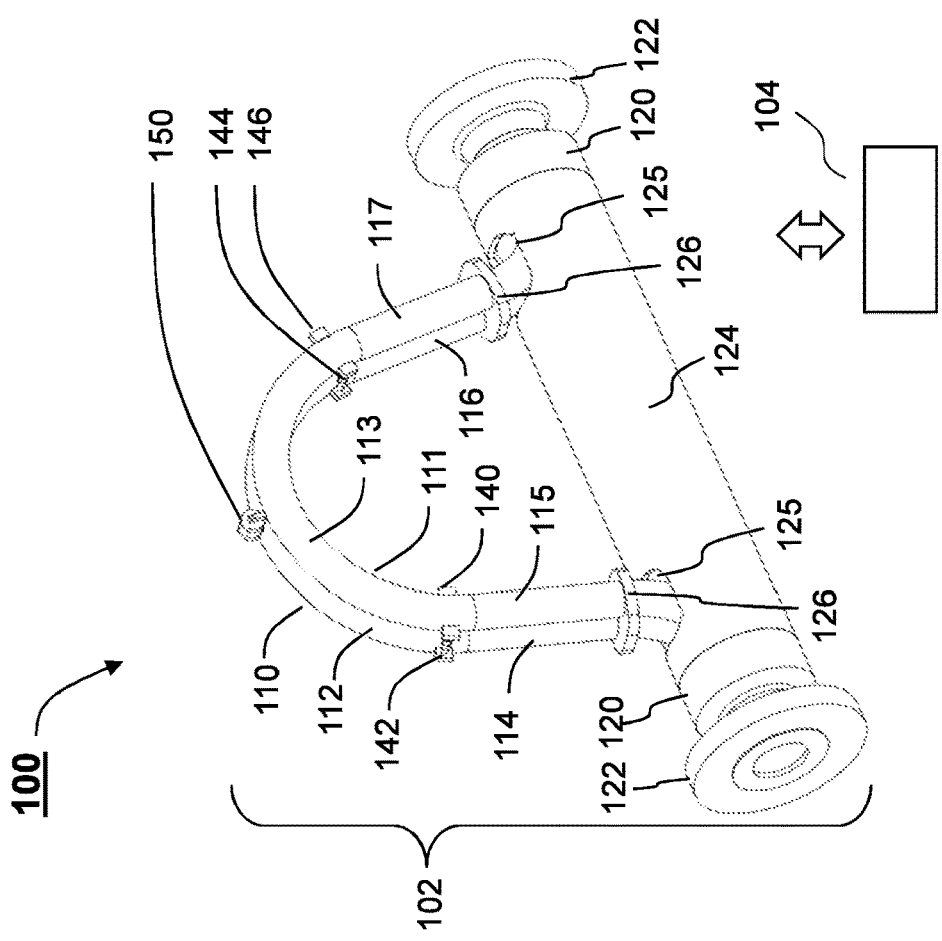

MEASURING DEVICE HAVING AT LEAST ONE BENT MEASURING TUBE FOR DETERMINING A MASS FLOW MEASURED VALUE OF A MEDIUM ACCORDING TO THE CORIOLIS PRINCIPLE

CROSS-REFERENCE TO RELATED APPLICATIONS

The present application is related to and claims the priority benefit of German Patent Application No. 10 2017 126 733.6, filed on Nov. 14, 2017, and International Patent Application No. PCT/EP2018/079632, filed on Oct. 30, 2018, the entire contents of which are incorporated herein by reference.

TECHNICAL FIELD

The present invention relates to a measuring device having at least one bent measuring tube for determining a mass flow measured value of a medium according to the Coriolis principle.

BACKGROUND

Such measuring devices are disclosed, for example, in DE 10 2009 046 839 A1, DE 10 2015 109 790 A1, DE 10 2012 018 988 A1 and DE 10 2011 119 980 A1. Measuring devices conforming to this type with bent measuring tubes are customary, since shorter structural lengths can be realized in this way with a given sensitivity of the measuring device. In the case of multiphase media, however, centrifugal forces in the bent measuring tubes can bring about an inhomogeneous distribution of the phases if they have different densities. As a result, this can lead to zones of different mass flow rates in the measuring tube. Depending on the degree of inhomogeneity, measurement errors can thus occur in measuring devices conforming to this type. The object of the present invention is, therefore, to find a remedy.

SUMMARY

The object is achieved by the measuring device according to independent claim 1.

The measuring device according to the invention for measuring the mass flow measured value of a medium according to the Coriolis principle comprises a measuring sensor and an operating and evaluation circuit, wherein the measuring sensor comprises: at least one vibrating measuring tube for conducting the medium, wherein the measuring tube is bent in its rest position, wherein the measuring tube runs essentially in a mirror-symmetrical manner with respect to a measuring tube transverse plane (SXY) which perpendicularly intersects the measuring tube, wherein a measuring tube center line (MM-1, MM-2) runs in a measuring tube longitudinal plane (SYZ-1, SYZ-2) which is aligned perpendicular to the measuring tube transverse plane (SXY), wherein a measuring tube equatorial surface (ME) runs perpendicular to the measuring tube longitudinal plane (SYZ-1, SYZ-2) along the measuring tube center line (MM-1, MM-2); at least one exciter for exciting measuring tube bending vibrations, wherein the exciter intersects the measuring tube transverse plane (SXY) the exciter; at least one first pair of vibration sensors for capturing the bending vibrations of the measuring tube, which are arranged in a mirror-symmetrical manner with respect to the measuring tube transverse plane (SXY); wherein the operating and evaluation circuit is designed to drive the exciter, to capture signals of the vibration sensors, and to determine a density and or a mass flow of a medium located in the measuring tube; characterized in that the measuring tube has a second pair of vibration sensors for capturing the bending vibrations of the measuring tube, which are arranged in a mirror-symmetrical manner with respect to the measuring tube transverse plane (SXY), wherein the first pair of vibration sensors is separated from the second pair of vibration sensors by the measuring tube equatorial surface (ME).

In a further development of the invention, the distance between a vibration sensor of the first vibration sensor pair and the nearest vibration sensor of the second vibration sensor pair is at least 0.5 diameters, for example at least 0.8 diameters of the measuring tube, in particular at least one diameter of the measuring tube.

In a further development of the invention, the distance between the vibration sensors of the first vibration sensor pair and the measuring tube equatorial surface is at least 0.3 diameters of the measuring tube, in particular at least 0.45 diameters of the measuring tube.

In a further development of the invention, the distance between the vibration sensors of the second vibration sensor pair and the measuring tube equatorial surface is at least 0.3 diameters of the measuring tube, in particular at least 0.45 diameters of the measuring tube.

In a further development of the invention, the operating and evaluation circuit is designed to determine a multi-phase medium as a function of a deviation between signals of the first pair of sensors and of the second pair of sensors.

In a further development of the invention, the multi-phase medium comprises a gas-laden liquid.

In a further development of the invention, the operating and evaluation circuit is designed to determine a mass flow measured value in each case as a function of the signals of the first pair of vibration sensors and of the second pair of vibration sensors.

In a further development of the invention, the operating and evaluation circuit is designed to determine a multi-phase medium, in particular a gas-laden liquid, as a function of a deviation between the mass flow measured values of the first and of the second pair of sensors.

In a further development of the invention, the operating and evaluation circuit is designed to determine an average mass flow measured value for the measuring device as a function of the two mass flow measured values of the first and of the second pair of sensors.

In a further development of the invention, the measuring sensor has at least one pair of essentially identical measuring tubes. which are arranged parallel to one another in order to vibrate relative to one another, wherein the exciter is arranged to excite measuring tube vibrations of the pair of measuring tubes relative to one another and the vibration sensors are arranged to capture vibrations of the measuring tubes of the pair of measuring tubes relative to one another.

In a further development of the invention, the measuring tubes of the pair of measuring tubes have a common measuring tube equatorial surface.

BRIEF DESCRIPTION OF THE DRAWINGS

The invention is now described in further detail on the basis of an exemplary embodiment shown in the drawings. The following are shown:

FIG. 1*a* shows a spatial representation of a measuring sensor of an exemplary embodiment of a measuring device according to the present disclosure.

FIG. 1b shows a schematic representation of the circuitry of the exciter and of the vibration sensors;

DETAILED DESCRIPTION

Figure 3:
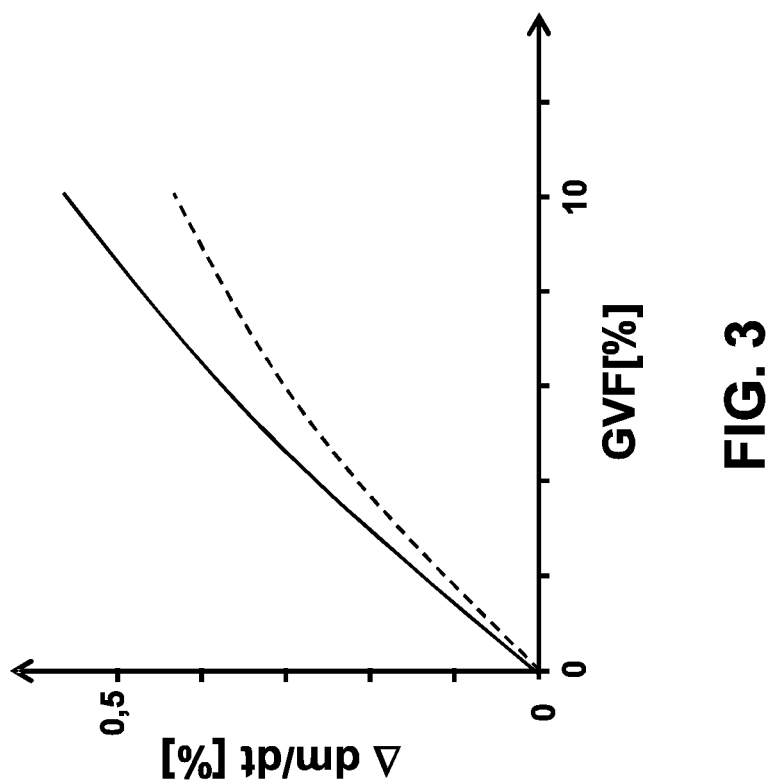
FIG. 3 shows a diagram of deviations between mass flow measured values based on sensor signals of the first pair of vibration sensors and mass flow measured values based on the second pair of vibration sensors as a function of a gas loading of the medium.

The exemplary embodiment of a mass flow measuring device 100 according to the invention shown in FIG. 1a comprises the measuring sensor 102 and an operating and evaluation circuit 104. The measuring sensor 102 comprises a pair of parallel-guided vibrating measuring tubes 110, 112 which are bent in the rest position and extend between inlet-side and outlet-side flow dividers 120. The flow dividers 120 each have a flange 122 by means of which the measuring sensor 102 can be installed in a pipeline, in order to guide a medium flowing in the pipeline through the measuring tubes 110, 112 of the measuring transducer 102. The collectors 120 are connected to an essentially cylindrical, rigid support tube 124, which has two openings 125 in its lateral surface, through which the measuring tubes 110, 112 are guided in an arch shape. In the measuring operation, sections of the measuring tubes 110, 112 running outside the support tube 124 are enclosed by a measuring tube housing, in order to protect them from environmental influences. For the sake of clarity, this measuring tube housing is not shown here. The measuring tubes 110, 112 are connected close to the apertures 125 to connection plates 126, through which a free vibrating length of the measuring tubes 110, 112 is defined. The freely vibrating sections of the measuring tubes each comprise two straight sections 114, 116, 115, 117, which are each connected to one another by an arch-shaped section 112, 113.

Figure 2A:
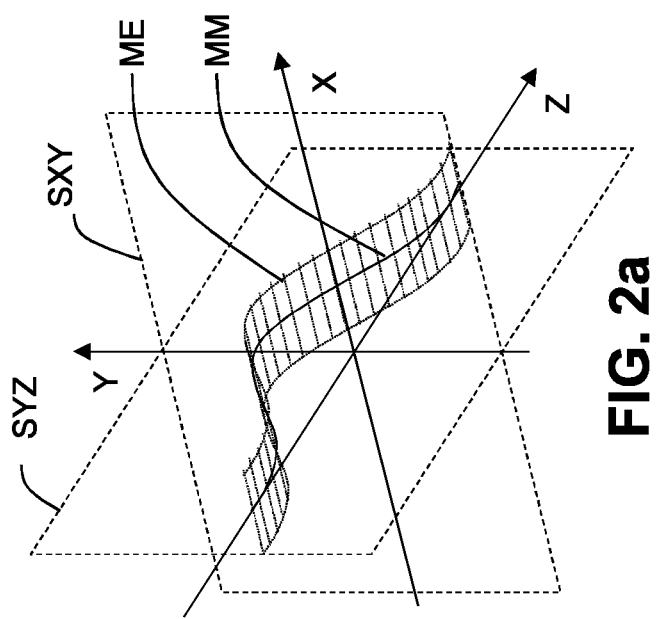
FIG. 2a shows a spatial representation of coordinates for describing the measuring sensor.
Figure 2B:
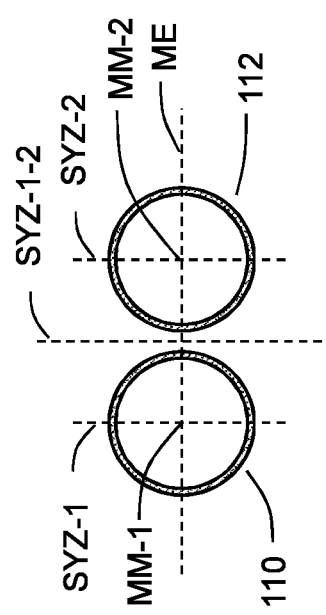
FIG. 2b shows a cross-section through the measuring tubes of a measuring sensor of a measuring device according to the present disclosure.

To explain geometric conditions and symmetries of the measuring sensor 102, reference is now made to FIGS. 2a and 2b, wherein FIG. 2a shows the conditions for a single measuring tube in a spatial representation, and FIG. 2b shows a cross-section through a pair of measuring tubes.

Each of the measuring tubes 110, 112 has a measuring tube center line MM; MM-1, MM-2, on which, in each case, a measuring tube longitudinal plane SYZ, SYZ-1, SYZ-2 runs. A measuring tube equatorial surface ME, which is common here to both measuring tubes 110, 112, runs along the measuring tube center line perpendicular to the Y-Z plane. The measuring tube center lines MM, MM-1, MM-2 run in a mirror-symmetrical manner with respect to a measuring tube transverse plane SXY, which is perpendicular to the measuring tube longitudinal planes SYZ, SYZ-1, SYZ-2 and intersects the measuring tube center lines at the apex of the arch-shaped sections of the measuring tubes. A measuring tube longitudinal plane SYZ-1, SYZ-2 with respect to which the former are mirror symmetrical, runs between the measuring tube longitudinal planes SYZ-1, SYZ-2.

The intersection between the measuring sensor longitudinal plane SYZ-1-2 and the measuring tube transverse plane SXY defines a Y-axis of a coordinate system, in which a Z-axis is defined in the longitudinal direction of the measuring sensor 102, which runs perpendicular to the measuring tube transverse plane SXY. Bending vibrations are excited in the X-direction.

As shown in FIG. 1a, the measuring sensor 102 has an electrodynamic exciter 150, which is arranged in the center of the measuring tube arc through which the measuring tube transverse plane runs, in order to excite a symmetrical bending vibration mode of use of the measuring tubes 110, 112 relative to one another in the X-direction. In this exemplary embodiment, the exciter 150 is arranged on the outside of the measuring tube arc, since in this way a higher efficiency can be achieved. In principle, the exciter can also be arranged on the inside of the measuring tube arc, wherein it can likewise be positioned symmetrically to the measuring tube transverse plane.

The measuring sensor 102 further comprises a first pair of electrodynamic vibration sensors 140, 144 which are arranged symmetrically to the measuring tube transverse plane on the inside of the measuring tube arc, and a second pair of electrodynamic vibration sensors 142, 146 which are arranged symmetrically to the measuring tube transverse plane on the outside of the measuring tube arc.

The electrodynamic exciter 150 and the vibration sensors 140, 142, 144, 146 have excitation or sensor coils, all of which are connected independently of one another to an operating and evaluation circuit 104, as schematically illustrated in FIG. 1b. The connection lines between the exciter 150 and the vibration sensors 140, 142, 144, 146 and the operating and evaluation circuit are not shown in FIG. 1a for the sake of clarity.

The operating and evaluation circuit 102 is configured to drive the exciter 150 with an excitation current signal, the frequency of which corresponds to a current use mode natural frequency of a bending vibration mode, and to capture the sensor signals of the vibration sensors 140, 142, 144, 146. The operating and evaluation circuit 102 is further configured to determine a first mass flow measured value from a first phase difference between the sensor signals of the first pair of vibration sensors 140, 144 and a second mass flow measurement value from a second phase difference between the sensor signals of the second pair of vibration sensors 142, 146.

For homogeneous media, the two mass flow measurements do not differ from one another in practice. If, on the other hand, an inhomogeneous medium flows through the measuring tubes, for example a gas-laden liquid, the two mass flow measured values can diverge from one another, in particular at higher mass flow rates, as will be explained below. Centripetal accelerations of several 100 m/s$^2$ can occur in the measuring tube bend so that the phases of the medium are distributed inhomogeneously to a certain degree after passing through the measuring tube bend. That is, the heavier liquid phase of the medium is enriched at the outside of the measuring tube bend, while the lighter, gaseous phase is displaced to the inside of the tube bend. The inside of the measuring tube bend is thus influenced by a greater mass flow than the inside of the measuring tube bend. This leads to significant deviations between the first mass flow measured value and the second mass flow measured value.

A corresponding experimental finding is shown in FIG. 3. The diagram shows the relative deviation of the second mass flow measured value from the first mass flow measured value at mass flow rates of 10,000 kg/h (solid line) and 5000 kg/h (dashed line) depending on the gas loading.

By storing corresponding reference data which characterize the measured value deviation as a function of gas loading and mass flow rate, the operating and evaluation circuit can be enabled to determine and optionally output a gas loading of a medium flowing through the measuring sensor at given first and second mass flow measured values, with the aid of their deviation from one another, on the one hand, and to determine and optionally output a corrected mass flow measured value, on the other hand.

The invention claimed is:

1. A measuring device for determining a mass flow measured value of a medium, the measuring device comprising:
 a measuring sensor configured to operate according to the Coriolis principle, the measuring sensor comprising:
  a measuring tube configured to vibrate and to conduct the medium, the measuring tube having a measuring tube center line, wherein:
   the measuring tube is bent in a rest position;
   the measuring tube extends substantially in a mirror-symmetrical manner with respect to a measuring tube transverse plane, which perpendicularly intersects the measuring tube;
   the measuring tube center line extends in a measuring tube longitudinal plane, which is aligned perpendicular to the measuring tube transverse plane; and
   a measuring tube equatorial surface extends perpendicular to the measuring tube longitudinal plane along the measuring tube center line;
  an exciter adapted to excite bending vibrations in the measuring tube;
  a first pair of vibration sensors configured to detect the bending vibrations of the measuring tube and generate corresponding signals, the first pair of vibration sensors arranged in a mirror-symmetrical manner with respect to the measuring tube transverse plane; and
 an operating and evaluation circuit configured to drive the exciter, to receive the signals from the vibration sensors, and to determine a mass flow measured value of a medium flowing through the measuring tube,
 wherein the measuring tube includes a second pair of vibration sensors configured to detect the bending vibrations of the measuring tube, the second pair arranged in a mirror-symmetrical manner with respect to the measuring tube transverse plane, and
 wherein the first pair of vibration sensors is arranged on a first side of and offset from the measuring tube equatorial surface, and the second pair of vibration sensors is arranged on a second side of and offset from the measuring tube equatorial surface.

2. The measuring device of claim 1, wherein a distance between a vibration sensor of the first pair of vibration sensors and a nearest vibration sensor of the second pair of vibration sensors is at least 0.5 diameters of the measuring tube.

3. The measuring device of claim 1, wherein a distance between a vibration sensor of the first pair of vibration sensors and a nearest vibration sensor of the second pair of vibration sensors is at least one diameter of the measuring tube.

4. The measuring device of claim 1, wherein a distance between the vibration sensors of the first pair of vibration sensors and the measuring tube equatorial surface is at least 0.3 diameters of the measuring tube, and/or
 wherein a distance between the vibration sensors of the second pair of vibration sensors and the measuring tube equatorial surface is at least 0.3 diameters of the measuring tube.

5. The measuring device of claim 1, wherein a distance between the vibration sensors of the first pair of vibration sensors and the measuring tube equatorial surface is at least 0.45 diameters of the measuring tube, and/or
 wherein a distance between the vibration sensors of the second pair of vibration sensors and the measuring tube equatorial surface is at least 0.45 diameters of the measuring tube.

6. The measuring device of claim 1, wherein the operating and evaluation circuit is configured to determine a gas loading of a liquid of the medium as a function of a deviation between signals of the first pair of vibration sensors and of the second pair of vibration sensors.

7. The measuring device of claim 1, wherein the operating and evaluation circuit is configured to determine a mass flow measured value as a function of the signals of the first pair of vibration sensors and of the second pair of vibration sensors, respectively.

8. The measuring device of claim 7, wherein the operating and evaluation circuit is configured to determine a gas loading of a liquid of the medium as a function of a deviation between the mass flow measured values of the first pair and second pair of vibration sensors.

9. The measuring device of claim 7, wherein the operating and evaluation circuit is configured to determine an average mass flow measured value for the measuring device as a function of the mass flow measured values of the first pair and second pair of vibration sensors.

10. The measuring device of claim 1, wherein the measuring sensor includes at least one pair of essentially identical measuring tubes, which at least one pair of measuring tubes includes the measuring tube and which are arranged parallel to one another as to vibrate relative to one another, wherein the exciter is arranged to excite measuring tube vibrations of the pair of measuring tubes relative to one another and the first pair and second pair of vibration sensors are arranged to capture vibrations of the measuring tubes of the pair of measuring tubes relative to one another.

11. The measuring device of claim 10, wherein the measuring tubes of the pair of measuring tubes share a common measuring tube equatorial surface.

* * * * *